(12) United States Patent
Klein et al.

(10) Patent No.: US 11,976,426 B2
(45) Date of Patent: May 7, 2024

(54) SOIL PROCESSING MACHINE AND METHOD FOR OPERATING A SOIL PROCESSING MACHINE

(71) Applicant: Hamm AG, Tirschenreuth (DE)

(72) Inventors: Thomas Klein, Mitterteich (DE); Stefan Braunschläger, Bärnau (DE); Ronny Pieske, Zwönitz (DE); Michael Sperber, Waldsassen (DE); Josef Dagner, Altenstadt (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 17/969,963

(22) Filed: Oct. 20, 2022

(65) Prior Publication Data
US 2023/0129246 A1   Apr. 27, 2023

(30) Foreign Application Priority Data
Oct. 22, 2021 (DE) ...................... 10 2021 127 442.7

(51) Int. Cl.
 *E01C 19/26* (2006.01)
 *B60K 7/00* (2006.01)
 (Continued)

(52) U.S. Cl.
 CPC .......... *E01C 19/266* (2013.01); *B60K 7/0015* (2013.01); *B60K 17/10* (2013.01);
 (Continued)

(58) Field of Classification Search
 CPC ............... B60Y 2200/413; E01C 19/26; F16H 61/4008; F16H 61/4017; F16H 61/4035; F16H 61/4157
 See application file for complete search history.

(56) References Cited

U.S. PATENT DOCUMENTS

| | | |
|---|---|---|
| 4,644,849 A | 2/1987 | Tanaka |
| 10,215,199 B2 * | 2/2019 | Cosoli ...................... F15B 1/04 |

(Continued)

FOREIGN PATENT DOCUMENTS

| | | | |
|---|---|---|---|
| CN | 110154773 | 8/2019 | |
| DE | 102010045857 A1 * | 3/2012 | ........... B60K 28/165 |

(Continued)

OTHER PUBLICATIONS

WO2011069597A1_t machine translation thereof (Year: 2011).*

(Continued)

*Primary Examiner* — Kenneth Bomberg
*Assistant Examiner* — Matthew Wiblin
(74) *Attorney, Agent, or Firm* — RANKIN, HILL & CLARK LLP (57) ABSTRACT

A soil processing machine, in particular a soil compactor, includes at least one drive roller and an electrohydraulic drive system for driving at least one drive roller. The drive system has a traction hydraulic circuit having at least one hydraulic motor and at least one hydraulic pump. The circuit includes a first line region between a first connection fitting of the at least one hydraulic pump and a first connection fitting of each hydraulic motor to drive the at least one drive roller in a first rotatable direction and a second line region between a second connection fitting of the at least one hydraulic pump and a second connection fitting of each hydraulic motor to drive the at least one drive roller in a second, opposite rotatable direction. A valve assembly is provided with each line region for selectively interrupting and releasing a fluid flow connection between the at least one hydraulic pump and at least one hydraulic motor.

27 Claims, 4 Drawing Sheets

(51) Int. Cl.
    *B60K 17/10*      (2006.01)
    *F16H 61/4008*    (2010.01)
    *F16H 61/4017*    (2010.01)
    *F16H 61/4035*    (2010.01)
    *F16H 61/4157*    (2010.01)

(52) U.S. Cl.
    CPC ..... *F16H 61/4008* (2013.01); *F16H 61/4017* (2013.01); *F16H 61/4035* (2013.01); *F16H 61/4157* (2013.01); *B60Y 2200/413* (2013.01)

(56) References Cited

U.S. PATENT DOCUMENTS

| 10,215,276 | B2* | 2/2019 | Serrao | F16H 61/452 |
| 11,247,653 | B2* | 2/2022 | Natali | B60T 7/12 |
| 2009/0127928 | A1 | 5/2009 | Udagawa et al. | |
| 2017/0175344 | A1 | 6/2017 | Bornemann et al. | |
| 2018/0128369 | A1* | 5/2018 | Hinsberger | F16H 61/4008 |

FOREIGN PATENT DOCUMENTS

| DE | 10 2011 116 875 | | 4/2013 | |
| JP | H06-336123 | | 12/1994 | |
| JP | 2017-110490 | | 6/2017 | |
| WO | WO-2011069597 A1 | * | 6/2011 | ......... F16H 61/4035 |
| WO | 2015034499 | | 3/2015 | |
| WO | WO-2015034499 A1 | * | 3/2015 | ............ B60K 17/10 |

OTHER PUBLICATIONS

DE102010045857A1_t machine translation thereof (Year: 2012).*
German Search Report for German application No. DE 10 2021 127 442.7 dated May 23, 2022, 10 pages (German).

* cited by examiner

SOIL PROCESSING MACHINE AND METHOD FOR OPERATING A SOIL PROCESSING MACHINE

The present invention relates to a soil processing machine, which can be designed as a soil compactor, for example, in order to compact an underlying surface, for example, asphalt material, gravel, or soil. Such soil processing machines can also be designed, for example, as wheel loaders, excavators, milling machines, or agricultural machines.

To avoid the use of fossil fuels in soil processing machines, the energy required in such a soil processing machine can be provided by one or more electric motors powered by one or more batteries, in particular also for driving the soil processing machine to move over the ground to be processed. The drive energy can be transmitted to one or more drive rollers via a hydraulic circuit, which can comprise one or more hydraulic traction pumps driven by one or more electric motors and one or more hydraulic traction motors assigned to each drive roller.

It is the object of the present invention to provide a soil processing machine and a method for operating such a soil processing machine, using which optimized operating behavior of the electrohydraulic drive system is achievable.

According to the invention, this object is achieved by a soil processing machine, in particular a soil compactor, comprising at least one drive roller driven to rotate and an electrohydraulic drive system for driving at least one drive roller, wherein the electrohydraulic drive system comprises a traction hydraulic circuit having at least one traction hydraulic motor assigned to at least one, preferably each drive roller and at least one traction hydraulic pump driven by an electric motor for conveying fluid in the traction hydraulic circuit, wherein the traction hydraulic circuit comprises a first line region between a first connection fitting of the at least one traction hydraulic pump and a respective first connection fitting of each traction hydraulic motor for conveying fluid to each traction hydraulic motor to drive the at least one drive roller in a first rotational direction and a second line region between a second connection fitting of the at least one traction hydraulic pump and a respective second connection fitting of each traction hydraulic motor for conveying fluid to each traction hydraulic motor to drive the at least one drive roller in a second rotational direction opposite to the first rotational direction, wherein a valve assembly is assigned to each line region for selectively interrupting and releasing a fluid flow connection between the at least one traction hydraulic pump and at least one traction hydraulic motor.

The provision of such valve assemblies in the flow direction of a fluid, for example hydraulic oil, in the traction hydraulic circuit on both sides of the at least one traction hydraulic motor allows the flow of energy into or in the traction hydraulic circuit or out of the traction hydraulic circuit to be optimized by targeted control of the valve assemblies. For example, in a braking state, if the braking torque provided by the electric motor operated in this state as a generator for energy recovery is not sufficient to decelerate a soil processing machine to the intended extent, an additional braking torque can be generated by throttling the fluid flow in the traction hydraulic circuit, so that an overload of the electric motor working as a generator and the battery powered from it can also be avoided. Since such a valve assembly is provided on both sides of the at least one traction hydraulic motor in the flow direction, this effect can be used independently of the direction in which a soil processing machine is being moved. With a soil processing machine constructed in this way, coordinated control of the electric motor on the one hand and the valve assemblies on the other hand can also ensure that when the soil processing machine is, for example, standing on a slope, it does not roll away in the downhill direction during the transition to a driving state. For this purpose, before the flow connection is released, such a fluid pressure can first be built up that prevents it from rolling away. Only when such a fluid pressure has built up is the fluid flow released and the soil processing machine is moved forward by further increasing the fluid pressure. Even if a slip state of one of the drive rollers is detected, it can be ensured in a soil processing machine constructed according to the invention by targeted action on the fluid flow to the traction hydraulic motors assigned to the various drive rollers that the speeds of the drive rollers are kept essentially the same in relation to one another or in the range of a ratio intended for essentially slip-free operation.

For uniform distribution of the drive energy, it is proposed that a plurality of drive rollers be provided and each drive roller be assigned a traction hydraulic motor, wherein the first line region, associated with each traction hydraulic motor, comprises a first motor branch line providing a fluid flow connection to the first connection fitting of the at least one traction hydraulic pump, and the second line region, associated with each traction hydraulic motor, comprises a second motor branch line providing a fluid flow connection to the second connection fitting of the at least one traction hydraulic pump.

In a structurally simple configuration, the valve assembly provided in association with the first line region can comprise a first valve unit, wherein the first valve unit is arranged in association with the first line region for selectively interrupting and releasing the fluid flow connection between the at least one traction hydraulic pump and each traction hydraulic motor, and/or the valve assembly provided in association with the second line region can comprise a second valve unit, wherein the second valve unit is arranged in association with the second line region for selectively interrupting and releasing the fluid flow connection between the at least one traction hydraulic pump and each traction hydraulic motor. A single valve unit is therefore sufficient in each of the line regions to act on the fluid flow, i.e., to interrupt, release, or throttle it.

It is to be noted in this context that in the context of the present invention, the selective interruption and release of a fluid flow connection by means of a valve assembly or a valve unit means that the fluid flow through the valve assembly or valve unit can be completely interrupted in a blocking position thereof, so that no fluid flows through the respective line region or a branch line, that the fluid flow through the valve assembly or valve unit can be released to the maximum possible extent in an open position thereof, or that the fluid flow through the valve assembly or valve unit can be throttled in a throttle position thereof, so that a fluid flow below the maximum possible fluid flow in the open position is achieved.

If multiple traction hydraulic motors are provided, the first line region can comprise a first main line connecting the first motor branch lines to the first connection fitting of the at least one traction hydraulic pump, and the first valve unit can be arranged in association with the first main line to implement a simple structure. Furthermore, it can be provided for this purpose that the second line region comprises a second main line connecting the second motor branch lines to the second connection fitting of the at least one traction hydraulic pump and the second valve unit is arranged in association with the second main line.

In an alternative embodiment, the valve assembly provided in the first line region, in association with each traction hydraulic motor, can comprise in each case a first valve unit for selectively interrupting and releasing the fluid flow connection between the traction hydraulic pump and the respective assigned traction hydraulic motor, so that each traction hydraulic motor can be set independently with regard to the fluid flow to be conducted to or away from it by corresponding actuation of the first valve unit assigned thereto. Correspondingly, the valve assembly provided in the second line region can comprise in each case a second valve unit associated with each traction hydraulic motor for selectively interrupting and releasing the fluid flow connection between the traction hydraulic pump and the respective assigned traction hydraulic motor.

For an individual fluid supply or fluid discharge to or from the various traction hydraulic motors, it is proposed that for each traction hydraulic motor, the first valve unit assigned to this traction hydraulic motor is arranged in association with the first motor branch line connecting this traction hydraulic motor to the first connection fitting of the at least one traction hydraulic pump, and/or that for each traction hydraulic motor, the second valve unit associated with this traction hydraulic motor is arranged in association with the second motor branch line connecting this traction hydraulic motor to the second connection fitting of the at least one traction hydraulic pump.

The first line region can comprise a first main line connecting the first motor branch lines to the first connection fitting of the at least one traction hydraulic pump. Furthermore, the second line region can comprise a second main line connecting the second motor branch lines to the second connection fitting of the at least one traction hydraulic pump.

For a defined setting of a fluid flow through a valve unit or the throttle effect to be provided by a valve unit, it is proposed that at least one first valve unit and/or at least one second valve unit comprises a proportional valve.

In an embodiment that is structurally simple to implement, it can be provided that at least one first valve unit and/or at least one second valve unit is under the actuation of an actuation unit and is actuatable by the actuation unit to selectively interrupt and release the fluid flow connection between the at least one traction hydraulic pump and at least one traction hydraulic motor.

In a further embodiment, at least one first valve unit and/or at least one second valve unit can be pressure controlled, wherein each pressure-controlled first valve unit and each pressure-controlled second valve unit is assigned a control valve controlled by a actuation unit for applying a control pressure to the assigned valve unit of the first valve unit and the second valve unit for selectively interrupting and releasing the fluid flow communication between the at least one traction hydraulic pump and at least one traction hydraulic motor. Such an actuation valve, which is under the actuation effect of the actuation unit, can also be designed as a proportional valve, for example, in order to apply a suitable actuation pressure to it in accordance with the extent to which an associated first valve unit or second valve unit is to be active to interrupt the fluid flow connection.

To increase operational reliability, at least one first valve unit and/or at least one second valve unit can be a normally closed valve unit. Is thus ensured, for example, that if there is a pressure drop or a power failure, the fluid flow connection to one or more traction hydraulic motors is automatically interrupted and a soil processing machine is thus brought to a standstill.

In order to avoid the occurrence of excessively high fluid pressures in the electrohydraulic drive system, it is furthermore proposed that the valve assembly provided in association with the first line region comprises at least one pressure relief valve for feeding back fluid to the traction hydraulic motor when a fluid limiting pressure in the first line region is exceeded, and/or that the valve assembly provided in association with the second line region comprises at least one pressure relief valve for feeding back fluid to the at least one traction hydraulic motor when a fluid limiting pressure in the second line region is exceeded.

In this case, for example, the valve assembly provided in association with the first line region can comprise a first pressure relief valve in association with a line section of the first line region between the at least one traction hydraulic pump and each first valve unit and can comprise a second pressure relief valve in association with a line section between each first valve unit and the at least one traction hydraulic motor. Furthermore, the valve assembly provided in association with the second line region can comprise a third pressure relief valve in association with a line section of the second line region between the at least one traction hydraulic pump and each second valve unit and can comprise a fourth pressure relief valve in association with a line section between each second valve unit and the at least one traction hydraulic motor.

In order, in consideration of the pressure conditions prevailing in the traction hydraulic circuit, in particular during the transition from a standstill state to a driving state, to be able to actuate the electric motor and/or the valve assemblies, it is proposed that a first pressure sensor arrangement be provided in association with the valve assembly arranged in the first line region, wherein the first pressure sensor arrangement comprises at least one pressure sensor for detecting a fluid pressure in a line section of the first line region between the first connection fitting of the at least one traction hydraulic pump and the valve assembly arranged in the first line region and at least one pressure sensor for detecting a fluid pressure in a line section of the first line region between the valve assembly arranged in the first line region and the at least one traction hydraulic motor, and/or that a second pressure sensor arrangement is provided in association with the valve assembly arranged in the second line region, wherein the second pressure sensor arrangement comprises at least one pressure sensor for detecting a fluid pressure in a line section of the second line region between the second connection fitting of the at least one traction hydraulic pump and the valve assembly arranged in the second line region and at least one pressure sensor for detecting a fluid pressure in a line section of the second line region between the valve assembly arranged in the second line region and the at least one traction hydraulic motor.

In order to be able to take the pressure conditions into consideration for each traction hydraulic motor, it is proposed that the first pressure sensor arrangement associated with each first motor branch line comprises a pressure sensor for detecting a fluid pressure in a line section of a respective first motor branch line between the first valve unit assigned thereto and the traction hydraulic motor assigned thereto, and/or that the second pressure sensor arrangement associated with each second motor branch line comprises a pressure sensor for detecting a fluid pressure in a line section of a respective second motor branch line between the second valve unit assigned thereto and the traction hydraulic motor assigned thereto.

To take into consideration the rotational behavior of the various drive rollers, in particular for anti-slip control, a speed sensor can be provided in association with at least one, preferably each drive roller, to provide speed information representing a speed of a respective drive roller.

Depending on the configuration of a respective soil processing machine, the drive roller provided on it or the drive rollers provided on it can be designed differently. For example, at least one drive roller can comprise a soil processing roller having a metal casing. Such soil processing rollers are used, for example, in order to compact or possibly crush the building material of ground. Furthermore, at least one drive roller can comprise at least one drive wheel, preferably a pair of drive wheels. In a further embodiment, at least one drive roller can comprise at least one rubber-wheel roller, preferably a pair of rubber-wheel rollers. Drive rollers of this type, designed as rubber-wheel rollers, are used, for example, for compacting asphalt material, as are soil processing rollers designed having a metal casing.

According to a further aspect, the object mentioned at the outset is achieved by a method for operating a soil processing machine according to the invention,
comprising the measures for providing a braking torque:
 a) in a drive state, driving the at least one traction hydraulic pump in such a way that fluid is conveyed via one line region of the first line region and second line region to the at least one traction hydraulic motor and fluid flows back via the other line region of the first line region and second line region to the at least one traction hydraulic pump,
 b) in a braking state following the drive state, interrupting or throttling a fluid flow in the other line region by means of the valve assembly arranged in the other line region,
and/or comprising the measures to prevent a soil processing machine standing on an inclined surface from rolling away during the transition to a drive state:
 c) in a standstill state, switching the valve assembly arranged in the first line region into a blocking state interrupting the fluid flow in the first line region and switching the valve assembly arranged in the second line region into a blocking state interrupting the fluid flow in the second line region,
 d) in the standstill state, detecting a first fluid pressure in a line section of the first line region between the valve assembly arranged in the first line region and the at least one traction hydraulic motor and detecting a second fluid pressure in a line section of the second line region between the valve assembly arranged in the second line region and the at least one traction hydraulic motor,
 e) upon ending of the standstill state for the transition to a drive state, controlling the electric motor assigned to the at least one traction hydraulic pump, taking into consideration the first fluid pressure detected in measure d) or the second fluid pressure detected in measure d),
and/or comprising the measures to prevent a slip state in a drive roller:
 f) in a drive state, driving the at least one traction hydraulic pump in such a way that fluid is conveyed via a line region of the first line region and second line region to a first traction hydraulic motor assigned to a first drive roller and to a second traction hydraulic motor assigned to a second drive roller and fluid flows back via the other line region of the first line region and the second line region from the first traction hydraulic motor and the second traction hydraulic motor to the at least one traction hydraulic pump,
 g) in the drive state, providing slip state information based on first speed information representing a speed of the first drive roller and/or second speed information representing a speed of the second drive roller,
 h) if the slip state information indicates an excessively high speed in one drive roller of the first drive roller and second drive roller in comparison to the other drive roller of the first drive roller and second drive roller, throttling the fluid flow to the traction hydraulic motor of the first traction hydraulic motor and second traction hydraulic motor assigned to the one drive roller by means of the valve assembly arranged in the first line region and/or the valve assembly arranged in the second line region.

To avoid unnecessary energy losses in the drive state, in measure a), the valve assembly arranged in the first line region can be in an open state that essentially does not throttle the fluid flow in the first line region and the valve assembly arranged in the second line region can be in an open state that essentially does not throttle the fluid flow in the second line region.

In order to be able to take into consideration the direction in which a soil processing machine that is stationary on an inclined surface would roll away when the valve assemblies are opened, it is proposed that in measure e), the electric motor assigned to the at least one traction hydraulic pump be actuated in consideration of the higher fluid pressure of the first fluid pressure and second fluid pressure.

The rolling away of a soil processing machine on an inclined surface during the transition to a drive state can be avoided in that, in measure d) and/or measure e), a third fluid pressure in a line section of the first line region between the at least one traction hydraulic pump and the valve assembly arranged in the first line region and/or a fourth fluid pressure in a line section of the second line region between the at least one traction hydraulic pump and the valve assembly arranged in the second line region is detected, and that in measure e), if the first fluid pressure is higher than the second fluid pressure, the electric motor assigned to the at least one traction hydraulic pump is actuated to convey fluid into the first line region in such a way that the third fluid pressure essentially corresponds to the first fluid pressure, and that in measure e), if the second fluid pressure is higher than the first fluid pressure, the electric motor assigned to the at least one traction hydraulic pump is actuated to convey fluid into the second line region in such a way that the fourth fluid pressure essentially corresponds to the second fluid pressure.

It is furthermore advantageous if, in measure e), the valve assemblies are switched from the blocking state to an open state when the third fluid pressure essentially corresponds to the first fluid pressure or when the fourth fluid pressure essentially corresponds to the second fluid pressure. The traction hydraulic motors are thus only released for movement when a fluid pressure preventing the vehicle from rolling away has built up in the traction hydraulic circuit In order to set a soil processing machine in motion after the two valve assemblies have been opened, after the first valve assembly and the second valve assembly have been switched into the open state, the electric motor assigned to the at least one traction hydraulic pump can be actuated to further increase the fluid pressure.

In measure h), the fluid flow to the traction hydraulic motor of the first traction hydraulic motor and second traction hydraulic motor assigned to the one drive roller can be throttled, for example, by means of the valve assembly arranged in the other line region of the first line region and second line region, thus downstream of a respective traction hydraulic motor in the traction hydraulic circuit.

For a defined anti-slip control, in measure h), the valve assembly arranged in the first line region and/or the valve assembly arranged in the second line region can then be actuated to throttle the fluid flow to the traction hydraulic motor assigned to one drive roller if speed information of the first speed information and second speed information indicates a speed that is above a target speed of the assigned drive roller, wherein the target speed is determined based on the first speed information and/or the second speed information.

If the two drive rollers have essentially the same external diameter, the target speed can correspond, for example, to the speed of the drive roller rotating at a lower speed. If the two drive rollers have different external diameters, the drive rollers have fundamentally different speeds even in the slip-free state. In this case, the target speed can furthermore be determined in consideration of a ratio of an external diameter of the first drive roller to an external diameter of the second drive roller.

The present invention is described in detail below with reference to the attached figures. In the figures.

Figure 1:
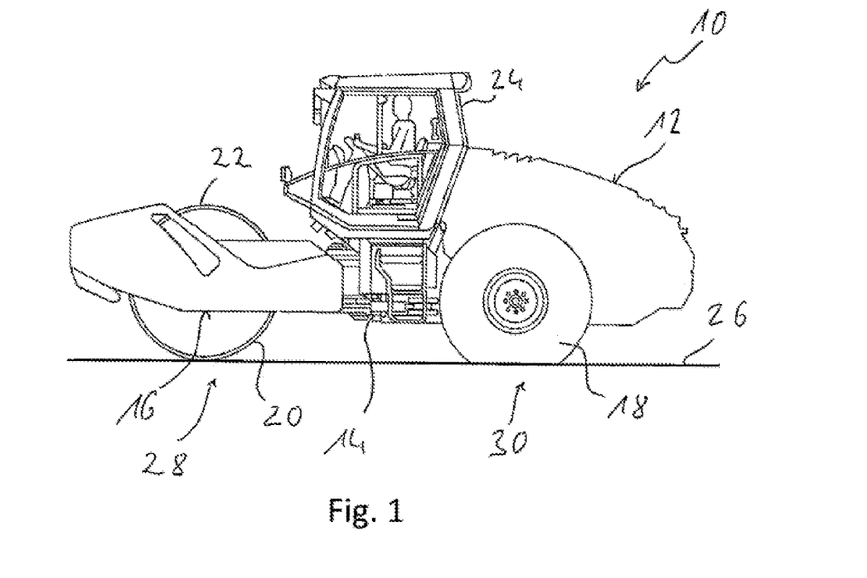
FIG. 1 shows a side view of a soil processing machine designed as a soil compactor.

A soil processing machine 10 shown in FIG. 1 and constructed in the form of a soil compactor comprises a rear carriage 12 and a front carriage 16 which is pivotably connected to the rear carriage 12 in an articulated connection region 14 for steering the soil compactor. Two drive wheels 18 driven to rotate by an electrohydraulic drive system described hereinafter are provided on the rear carriage 12. A soil processing roller 20 driven to rotate by the electrohydraulic drive system is provided on the front carriage 16, which in the exemplary embodiment shown has a metal casing 22 that is smooth radially on the outside and can be used, for example, to compact asphalt material, soil, rubble, or the like. A control station 24 is also arranged on the rear carriage 12. An operator can take a seat in the control station 24, which controls the soil processing machine 10 to move over the soil 26 to be processed in the soil processing mode.

For the following explanation of the structure and the function of the electrohydraulic drive system of the soil processing machine 10, it is assumed that the soil processing roller 20 arranged on the front carriage 16 provides a first drive roller 28, while the two drive wheels 18 provided on the rear carriage 12 are each viewed individually or together as a second drive roller 30.

Figure 2:
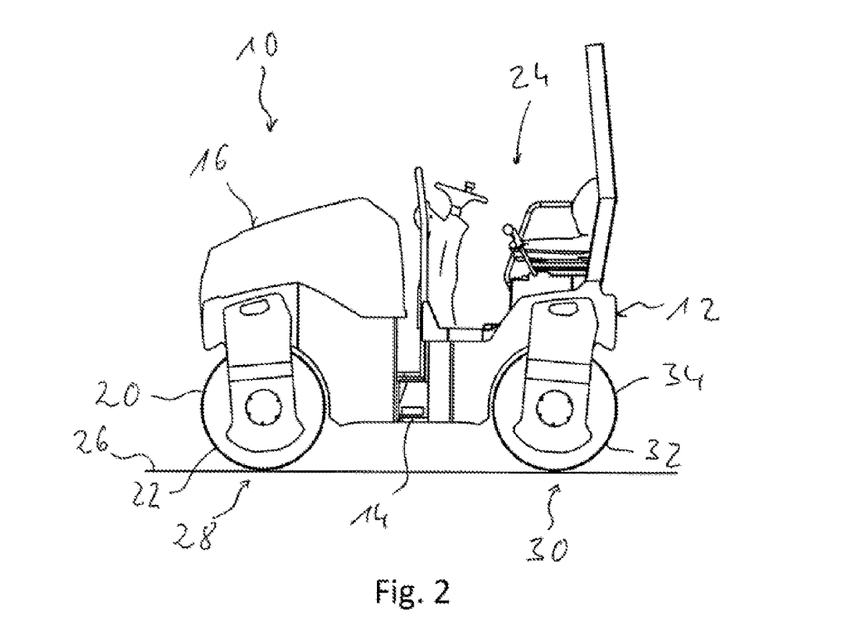
FIG. 2 shows a side view of an alternative embodiment of a soil processing machine designed as a soil compactor.

An alternative embodiment of a soil processing machine 10 designed as a soil compactor is shown in FIG. 2. In the example of a soil compactor shown in FIG. 2, a soil processing roller 32 is also provided on the rear carriage 12. This is also formed having a metal casing 34 that is made essentially smooth on the outer circumference, so that the soil compactor of FIG. 2 can similarly be used to compact the construction material of the ground 26. If one or both soil processing rollers 20, 32 of the soil compactor shown in FIGS. 1 and 2 are embodied having a metal casing 22 or 34 structured on the outer circumference, such a soil processing machine 10 or such a soil compactor can also be used for crushing the construction material of the ground 26.

For the purposes of the following explanation of an electrohydraulic drive system, in the soil compactor shown in FIG. 2, the two soil processing rollers 20, 32 form the first drive roller 28 and the second drive roller 30.

It is also to be noted that the principles described hereinafter for the structure and function of an electrohydraulic drive system can also be used in differently constructed soil processing machines. For example, a soil processing machine constructed as a soil compactor could also be designed in such a way that the drive wheels 18 shown in FIG. 1 are embodied as rubber-wheel rollers, which can similarly be used to compact the ground 26. In such a case, it is advantageous not only to provide two adjacent drive wheels 18 designed as rubber-wheel rollers, but also to provide, for example, four or five such drive wheels 18 designed as rubber-wheel rollers that are rotatable around a common axis and are driven to rotate, wherein each two drive wheels 18 or drive wheels 18 designed as rubber-wheel rollers can be drivable to rotate jointly. Drive wheels of this type, designed as rubber-wheel rollers, can be provided both on the rear carriage and on the front carriage.

Furthermore, it is to be noted that such a soil processing machine can also be designed, for example, as a wheel loader, in which, for example, two drive wheels drivable to rotate jointly are provided in each case on the front carriage and on the rear carriage.

A first exemplary embodiment of an electrohydraulic drive system 36 is explained hereinafter with reference to FIG. 3, which can be used, for example, in the soil processing machines 10 shown in FIGS. 1 and 2 and designed as soil compactors to move the respective soil processing machine 10 over the ground 26 to be compacted.

The electrohydraulic drive system 36 comprises a traction hydraulic circuit 38 in which a fluid, for example hydraulic oil, circulates or can be conveyed for circulation. For this purpose, the electrohydraulic drive system 36 has a traction hydraulic pump 42 which is driven by an electric motor 40 and which preferably has a constant delivery volume. This means that, with respect to a defined speed of the electric motor 40, the delivery volume of the traction hydraulic pump 42 is constant, but it can in principle vary with the speed. The electric motor 40 is powered from an electrical energy source, not shown, such as a battery, fuel cell, generator, or the like, and is under the actuation of an actuation unit 44. The voltage applied to the electric motor 40 is set by the actuation unit 44 in such a way that the electric motor 40 drives the traction hydraulic pump 42 at a speed required or suitable for a driving mode to be provided for the soil processing machine 10 in order to build up the required fluid pressure in the traction hydraulic circuit 38.

The traction hydraulic circuit 38 also includes two traction hydraulic motors 46, 48. The first traction hydraulic motor 46 can be assigned to the respective first drive roller 28, for example, in order to drive it to rotate, while the second traction hydraulic motor 48 can be assigned to the respective second drive roller 30 for the drive thereof. In the case of the soil processing machine 10 of FIG. 1, the second traction hydraulic motor 48 can, for example, jointly drive both drive wheels 18 to rotate. Each of the two traction hydraulic motors 46, 48 is preferably designed having constant displacement.

The traction hydraulic circuit 48 comprises a first line region 50. This establishes a connection between a first connection fitting 52 of the traction hydraulic pump 42 and respective first connection fittings 54, 56 of the traction hydraulic motors 46, 48. The first line region 50 comprises, in association with each traction hydraulic motor 46, 48, a first motor branch line 58, 60, wherein the first motor branch line 58 assigned to the first traction hydraulic motor 46 adjoins the first traction hydraulic motor 46 in the region of the first connection fitting 54 of the first traction hydraulic motor 46 and the first motor branch line 60 assigned to the second traction hydraulic motor 48 adjoins the second traction hydraulic motor 48 in the region of the first connection fitting 56 of the second traction hydraulic motor 48.

The first line region 50 furthermore comprises a first main line 62, which adjoins the traction hydraulic pump 42 in the region of the first connection fitting 52 and establishes a connection between the first connection fitting 52 and the two first motor branch lines 58, 60.

The traction hydraulic circuit 38 furthermore comprises a second line region 64, which establishes a connection between a second connection fitting 66 of the traction hydraulic pump 42 and respective second connection fittings 68, 70 of the first traction hydraulic motor 46 and the second traction hydraulic motor 48.

In association with each of the two traction hydraulic motors 46, 48, the second line region 64 respectively comprises a second motor branch line 72, 74. The second motor branch line 72 assigned to the first traction hydraulic motor 46 adjoins the first traction hydraulic motor 46 in the region of the second connection fitting 68 of the first traction hydraulic motor 46, and the second motor branch line 74 assigned to the second traction hydraulic motor 48 adjoins the second traction hydraulic motor 48 in the region of the second connection fitting 70 of the second traction hydraulic motor 48. The second line region 64 furthermore comprises a second main line 76. The second main line 76 adjoins the traction hydraulic pump 42 in the region of the second connection fitting 66 and connects the two second motor branch lines 72, 74 to the second connection fitting 66 of the traction hydraulic pump 42.

It is to be noted that the various first and second connection fittings 52, 54, 56 and 66, 68, 70 can be viewed as those regions in which the various line regions 50, 64 receive fluid from the traction hydraulic pump 42 and the traction hydraulic motors 46, 68 or feed fluid into them. Connection fittings of this type can be constructed in a wide variety of ways.

In association with each of the two line regions 50, 64, a respective valve assembly 78, 80 is provided. The valve assembly 78 assigned to or arranged in the first line region 50 comprises a first valve unit 82 designed, for example, as a proportional valve and under the actuation of the actuation unit 44. Likewise, the valve assembly 80 assigned to or arranged in the second line region 64 comprises a second valve unit 84 designed, for example, as a proportional valve and under the actuation of the actuation unit 44. The first valve unit 82 of the valve assembly 78 is arranged in the first main line 62 of the first line region 50. The second valve unit 84 of the valve assembly 80 is arranged in the second main line 76 of the second line region 64. The first valve unit 82 and the second valve unit 84 are designed as normally closed valves.

Figure 3:
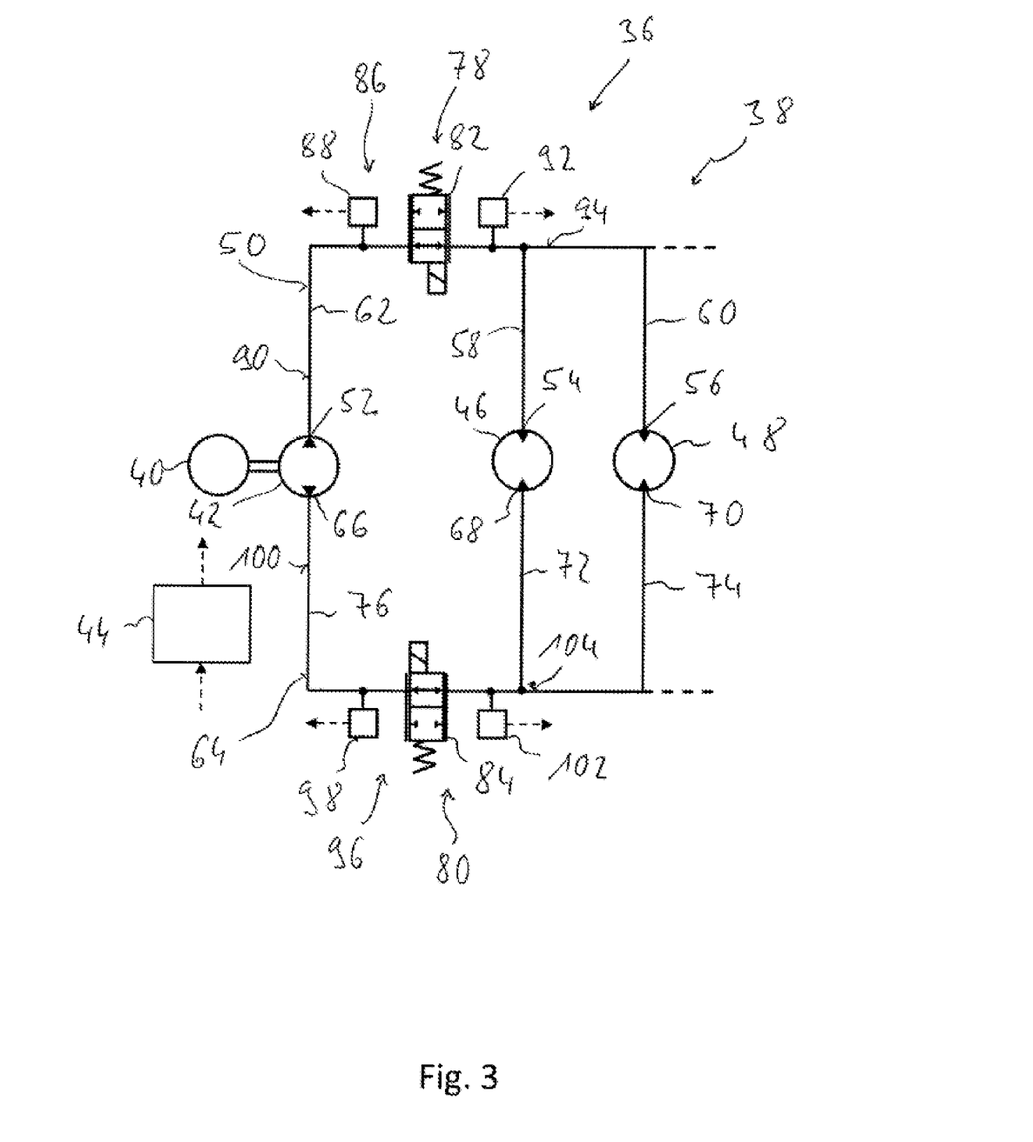
FIG. 3 shows an electrohydraulic drive system for a soil processing machine.

If the valve units 82, 84 are actuated appropriately, they can be switched, for example, between two valve positions illustrated in FIG. 3 if designed as proportional valves. In the open position shown in FIG. 3, the valve units 82, 84 release the respective line regions 50, 64 for flow or provide a minimum flow resistance. In the other valve position, i.e., a closed position, the valve units 82, 84 block the respective assigned line region 50, 64 against the flow of fluid, for example hydraulic oil. By clocked actuation of the valve units 82, 84 and periodic switching between the open position and the blocking position, they can be switched to a throttle state or operated in a throttle mode, in which the fluid flow is throttled in the respective line region 50, 64, i.e., an increased flow resistance is provided for the fluid conveyed by the traction hydraulic pump 42 in the respective line region 50 or 54.

A pressure sensor arrangement 86, 96 is provided in association with each line region 50, 64 or with each valve assembly 78 or 80, respectively. The first pressure sensor arrangement 86 assigned to the first line region 50 or the valve assembly 78 comprises a pressure sensor 88 which is designed or arranged to detect the fluid pressure in a line section 90 of the first line region 50 between the traction hydraulic pump 42 and the valve assembly 78 or the first valve unit 82. The first pressure sensor arrangement 86 furthermore comprises a pressure sensor 92, which is designed or arranged to detect the fluid pressure in a line section 94 of the first line region 50 between the valve assembly 78 or the first valve unit 82 thereof and the two traction hydraulic motors 46, 48. The pressure sensors 88, 92 output a signal representing the respective detected pressure to the actuation unit 44.

A second pressure sensor arrangement 96 is assigned to the second line region 64 or the valve assembly 80. This comprises a pressure sensor 98 in a line section 100 of the second line region 64 between the traction hydraulic pump 42 and the valve assembly 80 or the second valve unit 84 thereof. The second pressure sensor arrangement 96 furthermore comprises a pressure sensor 102, which is designed or arranged to detect a fluid pressure in a line section 104 of the second line region 64 between the valve assembly 80 or the second valve unit 84 and the two traction hydraulic motors 46, 48.

The two pressure sensors 98, 102 also output the signal representing the respective detected fluid pressure to the actuation unit 44.

The pressure sensors 88, 92 or 98, 102 assigned to the two line regions 50, 64 can be integrated, for example, in the various line sections 90, 94 or 100, 104 at a distance from the valve assemblies 78, 80. Alternatively, one or more of these pressure sensors 88, 92, 98, 102 can be provided in the respective valve assembly 78, 80, for example at a respective connection region in which the respective valve unit 82, 84 is connected to the first line region 50 or the second line region 64.

In the normal driving mode, the actuation unit 44 actuates the electric motor 40 in such a way that the traction hydraulic pump 42 feeds fluid under pressure into the first line region 50 or the second line region 64 and thus to the two traction hydraulic motors 46, 48. For example, it is assumed that in order to move the soil compactor 10 in a forward direction, i.e., to the left in each of FIGS. 1 and 2, the traction hydraulic pump 42 is driven in such a way that pressurized fluid is fed into the first line region 50 and flows via this to the first connection fittings 54, 56 of the traction hydraulic motors 46, 48. After flowing through the two traction hydraulic motors 46, 48, the fluid flows back via the second line region 64 to the second connection fitting 66 of the traction hydraulic pump 42. The speed of the two traction hydraulic motors 54, 56, which are preferably constructed having constant displacement, can be determined solely by the speed of the traction hydraulic pump 42, which is preferably constructed having constant delivery volume, and whose speed can in turn be set by appropriate actuation of the electric motor 40. If the soil compactor 10 is to be moved in the opposite direction, i.e., in the reverse travel direction, the traction hydraulic pump 42 is driven to rotate in the opposite direction, so that it conveys pressurized fluid via its second connection fitting 66 into the second line region 64 and via this to the two traction hydraulic motors 46, 48. These, and thus also the drive rollers 28, 30 driven to rotate by them, then rotate in a rotational direction opposite to the rotational direction for the forward driving mode. The fluid discharged from the traction hydraulic motors 46, 48 flows back via the first line region 50 to the first connection fitting 52 of the traction hydraulic pump 42.

In a drive state, i.e., for example when the soil compactor 10 is moving in the forward travel direction, the electric motor 40 powered from the electrical energy source drives the traction hydraulic pump 42 to convey the fluid in the direction provided for a respective driving state in the traction hydraulic circuit 38. If, starting from such a drive state, the soil processing machine 10 is to be braked, i.e., decelerated, the excitation of the electric motor 40 is ended, so that it no longer drives the traction hydraulic pump 42. Due to the inertia of the soil processing machine 10, in such a braking state the two traction hydraulic motors 46, 48 act as pumps and basically convey the fluid further in the same circulation direction in which it was previously conveyed to circulate by the traction hydraulic pump 42 in the drive state. Due to the fluid circulation generated by the traction hydraulic motors 46, 48, the traction hydraulic pump 42 acts as a hydraulic motor in such a braking state and drives the electric motor 40 or its rotor to rotate. In this braking state, the electric motor 40 can thus act as a generator, which can feed energy back into an electrical energy source assigned thereto.

Since the braking torque provided by electric motor 40 in the generator operating state thereof may not always be sufficient, depending on the operating state of electric motor 40, to generate a required braking torque, in the electrohydraulic drive system 36 shown in FIG. 3, the valve assemblies 70, 80 are actuated by means of the actuation unit 44 in such a way that they generate a braking torque. If, in the drive state preceding the braking state, fluid has been conducted from the traction hydraulic pump 52 via the first line region 50 to the traction hydraulic motors 46, 48, then in the subsequent braking state these convey the fluid via the second line region 64 to the traction hydraulic pump 42 then acting as a motor. To generate a braking torque, the valve assembly 80 arranged in the second line region 64 or its second valve unit 84 can be actuated by the actuation unit 44, taking into consideration the pressure information supplied by the pressure sensors 98, 102, in such a way that it generates a throttling effect, i.e., for example is operated in the throttle operating state explained above. Due to the increased flow resistance introduced in this way, the traction hydraulic motors 46, 48 are also braked, so that in addition to the braking torque provided by the electric motor 44, a braking torque generated by hydraulic interaction occurs at the traction hydraulic motors 46, 48. By adjusting the throttling effect of the valve assembly 80 by means of the actuation unit 44, the dimension of this braking torque and thus the deceleration of the soil processing machine 10 can be adjusted. For example, this delay can be adjusted in accordance with the extent to which a brake pedal or other braking element is actuated in the control station 24. Correspondingly, if in the previous drive state the traction hydraulic pump 42 conducted fluid via the second line region 64 to the traction hydraulic motors 46, 48, in a subsequent braking state, the first valve unit 82 of the valve assembly 78 of the first line region 50 can be actuated to generate a throttle effect in order to decelerate the traction hydraulic motors 46, 48.

The information provided by the various pressure sensors 88, 82 or 98, 102 about the fluid pressure prevailing in the respective line sections 90, 94, 100, 104 can be used, when the soil processing machine 10 is to be set in motion from a standstill state, to prevent the soil processing machine 10 from rolling away when it is standing on inclined ground 26.

In the standstill state, the two valve assemblies 78, 80 can be actuated or adjusted in such a way that they interrupt the fluid flow in the first line region 50 or in the second line region 64. If no fluid can flow through the line regions 54, 64, the traction hydraulic motors 46, 48 cannot rotate, so that the function of a parking brake can be provided by the valve units 82, 84 of the valve assemblies 78, 80 being held in the blocking position.

If the soil processing machine 10 is standing on inclined ground, this has the result that the traction hydraulic motors 46, 48 are subjected to a torque. Since these cannot rotate when the valve assemblies 78, 80 are held in the blocking position, depending on the direction in which the traction hydraulic motors 46, 48 are subjected to a torque, an increased fluid pressure arises in one of the line sections 94, 104 between the traction hydraulic motors 46, 48 and the valve assemblies 78, 80. If, for example, the soil processing machine 10 is standing on ground 26 that slopes from left to right in FIGS. 1 and 2, the soil processing machine 10 is subjected to movement in the reverse travel direction due to the occurring downhill force. When moving in the reverse travel direction, fluid basically flows from the second line region 64 via the traction hydraulic motors 46, 48 into the first line region 50. This in turn means that when acted upon in the reverse travel direction, the traction hydraulic motors 46, 48 have a tendency to convey fluid in the first motor branch lines 58, 60 assigned to them and thus in the line section 94, so that an increased fluid pressure arises therein, which is detected by the pressure sensor 92. If the soil processing machine 10 is standing on ground 26 that slopes down from right to left in FIGS. 1 and 2, due to the corresponding action on the traction hydraulic motors 46, 48, the fluid pressure in the second motor branch lines 72, 74 assigned thereto and thus in the line section 104 would increase and a correspondingly increased fluid pressure would be detected by the pressure sensor 102.

In the standstill state, the actuation unit 44 compares the signals output by the two pressure sensors 92, 102 and representing the fluid pressures in the line sections 94, 104 and recognizes in which of the line sections 94, 104 a higher fluid pressure prevails. If, starting from such a standstill state, the soil processing machine is to be set in motion and return to a drive state in which the soil processing machine 10 is to be moved in the opposite direction to the downhill force acting thereon, the actuation unit 44 actuates the electric motor 40 in such a way that, in that line region 50, 64, in which the assigned pressure sensor 92, 102 indicates an increased fluid pressure, the fluid pressure in the respective line section 90 or 100 is increased. If, for example, the pressure sensor 92 indicates an increased fluid pressure in the line section 94 of the first line region 50, the electric motor 40 is first actuated in such a way that the traction hydraulic pump 42 feeds fluid into the line section 90 and the fluid pressure in the line section 90 thus rises, wherein the rising fluid pressure in the line section 90 can be seen in the output signal of the pressure sensor 88.

The electric motor 40 is actuated in such a way that the fluid pressure in the line section 90 is in the range of the fluid pressure in the line section 94 detected by the pressure sensor 92. If these two fluid pressures are approximately equal, the two valve units 82, 84 initially held in their blocking position can be switched to their respective open position. Since there is a sufficiently high pressure in the line section 90 of the first line region 50, fluid is prevented from flowing out of the line section 94 into the line section 90 upon the transition of the valve unit 82 into its open position, which would result in the soil processing machine 10 rolling back. Due to the balanced fluid pressure in the two line sections 90, 94, upon opening of the two valve units 82, 84, the soil processing machine 10 is initially held stationary by the fluid pressure that has built up. By increasing the speed of the electric motor 40 and thus the traction hydraulic pump 42, the fluid pressure in the first line region 50 can then be increased and thus the soil processing machine 10 can be set in motion in the desired movement direction. Since the two valve assemblies 78, 80 are then opened when the pressures in this case are balanced in the first line region 50 on both sides of the valve assembly 78, when the valve assemblies 78, 80 are opened, there is also no pressure surge acting on the traction hydraulic motors 46, 48, which would result in abrupt or jerky starting of the soil processing machine 10 and possibly spinning of the drive rollers 28, 30.

A corresponding procedure can be followed if the actuation unit 44 recognizes that the fluid pressure in the line section 104 detected by the pressure sensor 102 is higher than the fluid pressure in the line section 94 detected by the pressure sensor 92. In this case, when the soil processing machine 10 is to be set in motion again, the electric motor 40 is actuated in such a way that the traction hydraulic pump 42 feeds fluid into the line section 100 of the second line region 64 until the fluid pressure detected by the pressure sensor 98 essentially corresponds to the fluid pressure detected by the pressure sensor 102. Once this has been achieved, the two valve assemblies 78, 80 or their valve units 82, 84 can be switched to the open position in order then to set the soil processing machine 10 in motion at a further increased speed of the electric motor 40.

Figure 4:
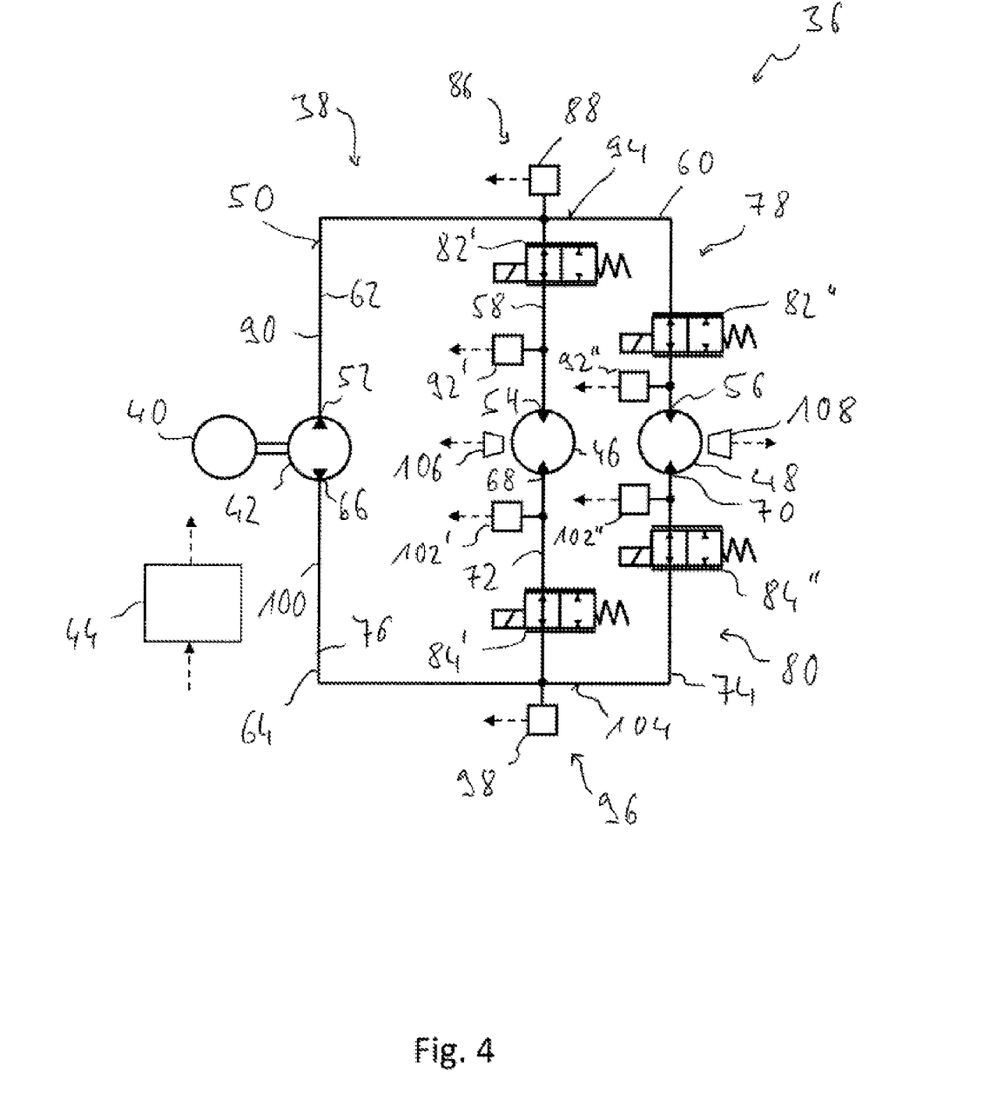
FIG. 4 shows an alternative embodiment of an electrohydraulic drive system for a soil processing machine.

FIG. 4 shows an alternative embodiment of an electrohydraulic drive system 36 for a soil compactor 10. In the electrohydraulic drive system 36 shown in FIG. 4, the valve assembly 78 assigned to the first line region 50 comprises two first valve units 82', 82". The first valve unit 82' is arranged in the first motor branch line 58 assigned to the first traction hydraulic motor 46 and the first valve unit 82" is arranged in the first motor branch line 60 assigned to the second traction hydraulic motor 48. In addition to the pressure sensor 88, which detects the fluid pressure in the line section 90 between the traction hydraulic pump 42 and the valve assembly 78, the first pressure sensor arrangement 86 also comprises a pressure sensor 92', 92" in each first motor branch line 58, 60. The pressure sensor 92' detects the fluid pressure in the first motor branch line 58 between the first valve unit 82' and the first traction hydraulic motor 46. The pressure sensor 92" detects the fluid pressure in the first motor secondary line 60 assigned to the second traction hydraulic motor 48 in a region between the valve unit 82" and the second traction hydraulic motor 48.

Likewise, the valve assembly 80 provided in the second line region 64 comprises a second valve unit 84' in the second motor branch line 72 assigned to the first traction hydraulic motor 46 and a second valve unit 84" in the second motor branch line 74 assigned to the second traction hydraulic motor 48. The second pressure sensor arrangement 96 comprises, in association with the first traction hydraulic motor 46, a pressure sensor 102' which detects a fluid pressure in the second motor branch line 72 assigned to the first traction hydraulic motor 46 in a region between the first traction hydraulic motor 46 and the second valve unit 84' assigned thereto. The second pressure sensor arrangement 96 furthermore comprises a pressure sensor 102", which is arranged in the second motor branch line 74 assigned to the second traction hydraulic motor 48 in a region between the second traction hydraulic motor 48 and the second valve unit 84" assigned thereto. Furthermore, the second pressure sensor arrangement 96 comprises the pressure sensor 98, which detects the fluid pressure in the line section 100 between the traction hydraulic pump 42 and the valve assembly 80, i.e., the two second valve units 84', 84" thereof.

In this embodiment as well, the first valve units 82', 82" and the second valve units 84', 84" are designed as normally closed valves, so that, for example, if a power failure or another defect occurs, for example in the actuation unit 44, and therefore there is no actuation signal for the valve units 82', 82", 84', 84" and they enter their blocking state and interrupt the fluid flow connection from or to the traction hydraulic motors 46, 48, by which the soil processing machine 10 is brought to a standstill.

In the case of the electrohydraulic drive system 36 shown in FIG. 4, all of the functions explained above with reference to the electrohydraulic drive system 36 can be fulfilled. To generate a braking torque or an additional braking torque, the valve units 82', 82", 84', 84" can be switched into a throttle state in order to be able to throttle a fluid flow from the traction hydraulic motors 46, 48, which act as pumps in the braking state, to the traction hydraulic pump 42. Since the throttle effect to be generated in each case can be adjusted independently of the other traction hydraulic motor in association with the two traction hydraulic motors 46, 48, it is possible to provide the braking torques to be generated at the two traction hydraulic motors 46, 48 independently of one another and with different dimensions. This can be advantageous, for example, when there are traction effects in different amounts between the differently designed drive rollers 28, 30 and the ground 26, as in the soil processing machine 10 shown in FIG. 1. It can thus be prevented that, for example, a braking torque is generated at one of the drive rollers 28, 30, which puts it in a slip state, while no slip occurs at the respective other drive roller due to stronger traction. Of course, in the case of the electrohydraulic drive system 36 shown in FIG. 4, this braking effect can also be provided in both movement directions of the soil processing machine 10.

The prevention of rolling away during the transition from a standstill state to a driving state can also be implemented in the manner described above. It is also possible here, by selective actuation of the two valve assemblies 78, 80 or the first and second valve units 82', 82" and 84', 84", to actuate the two traction hydraulic motors 46, 48 independently of one another to generate the holding torque. For example, only the first traction hydraulic motor 46 could be used, after corresponding pressure build-up in the line section 90 or in the line section 100 and switching the valve unit 82' or the valve unit 84' into the open state, initially to prevent the soil processing machine 10 from rolling away on the sloping ground, in order, after further increase of the fluid pressure or accompanying a further increase of the fluid pressure, to also switch the valve units 82", 84" assigned to the second traction drive motor 48 into the open state, and thus use both traction drive motors and the drive rollers 28 and 30 interacting with them to set the soil processing machine 10 into motion.

The mutually independent supply of the traction hydraulic motors 46, 48 with fluid also makes it possible, for example taking into consideration speed information provided by these or the speed sensors 106, 108 assigned to the drive rollers 28, 30 driven thereby, to perform anti-slip control of the drive rollers 28, 30 driven by the traction hydraulic motors 46, 48.

If the actuation unit 44 recognizes that the speeds of the traction hydraulic motors 46, 48 or the drive rollers 28, 30 driven thereby, represented in the output signals of the speed sensors 106, 108, deviate from one another to an extent that is above a permissible threshold, for example, which means that the occurrence of a slip state is recognized and slip state information is accordingly present, taking into consideration this slip state information indicating the deviation of the speeds of the drive rollers 28, 30 from one another or from a respective target speed, by actuating at least one of the valve units 82', 84' or 82", 84" assigned to the faster-rotating traction hydraulic motor 46 or 48, the fluid flow through this traction hydraulic motor can be throttled, so that its speed decreases. Due to the throttling effect introduced in this way, the fluid pressure on the other traction hydraulic motor is increased slightly so that its speed increases and the two speeds thus approach one another, for example until they essentially correspond to one another again or the existing speed deviation is below the threshold permissible for this. If this state has been reached, the previously throttled fluid supply can be released again, i.e., the throttling valve unit can be set back into the open position or the previously assumed state.

It is to be taken into consideration that, for example, in the structure of a soil processing machine 10 designed as a soil compactor shown in FIG. 2, the two drive rollers 28, 30 designed as soil processing rollers 20, 32 have the same external diameter. The speed of the drive roller rotating slower can therefore be used as the reference speed or target speed for the drive roller rotating faster in a slip state. In this case, if the speed of the drive roller rotating faster exceeds the speed of the drive roller rotating slower by a permissible extent, slip control can begin, wherein the throttling effect introduced by corresponding valve actuation can also increase with increasing speed deviation.

In the exemplary embodiment of a soil processing machine 10 shown in FIG. 1, the drive rollers 28, 30, which are to be compared to one another with respect to their speed, have fundamentally different diameters from one another. This means that even in a slip-free state, the drive roller 28 designed as a soil processing roller 20 has a different speed, for example a lower speed, than the drive roller 30 designed as a drive wheel 18 or as a pair of drive wheels. In this case, the speed of the respective other drive roller cannot be taken into consideration directly as the reference speed, rather scaling to be carried out on the basis of the ratio of the external diameters of the two drive rollers 28, 30 has to take place first. If, for example, the speed of the drive wheel 18 having the smaller diameter is 10% greater than the speed of the soil processing roller 20 having the larger diameter, the speed of the soil processing roller 20 reduced by a corresponding factor can be used as the target speed for each drive wheel 18 acting as a drive roller 30 or correspondingly scaled speeds can be compared to one another in order to detect the occurrence of a slip state and then to achieve an equalization of the speeds by throttling the fluid flow to the traction hydraulic motor of the drive roller rotating too fast.

In an alternative embodiment or procedure, a speed sensor can be used in association with only one of the two drive rollers 28, 30 or 20, 18 and the speed of the electric motor 40 can be taken into consideration as supplementary information, which is generally detected or provided in order to be able to operate it in the desired operating state. In particular when, as explained above, the traction hydraulic pump 42 is designed having a constant delivery volume and the traction hydraulic motors 46, 48 are designed having a constant displacement, there is a defined ratio between the speed of the electric motor 40 driving the traction hydraulic pump 42 and the speed of the traction hydraulic motors 46, 48. If the traction hydraulic pump 42, which is driven at a defined speed, conducts fluid in equal proportions into the two traction hydraulic motors 46, 48, they drive the assigned drive rollers at a known speed predetermined by the design of the traction hydraulic motors 46, 48. If both traction hydraulic motors 46, 48 are of the same design, they drive the assigned drive rollers to rotate at the same speed when fed with the same amount of fluid.

If it is assumed that, for example, one of the drive rollers is stationary, i.e., not rotating, while the other drive roller is driven to rotate by the assigned traction hydraulic motor, this means that all of the fluid supplied by the traction hydraulic pump is fed through the traction hydraulic motor driving the rotating hydraulic motor, which in turn has the consequence that due to the circumstance that the amount of fluid conveyed by the traction hydraulic pump is known and the displacement of the traction hydraulic motor driving the rotation is known, the speed at which this drives the assigned drive roller to rotate is also known. This also applies if, for example due to a slip that occurs, the drive rollers driven by the two traction hydraulic motors have different speeds from one another or deviate from the target speeds that are respectively specified for them. Due to the circumstance that the amount of fluid conveyed by the traction hydraulic pump 42 is known for each speed of the electric motor 40 and the quantity of fluid received in the assigned traction hydraulic motor is known when the speed of one of the driven drive rollers is detected, it is also known which amount of fluid is received by the other traction hydraulic motor, by which in turn it can be determined based on the known displacement thereof at which speed the drive roller driven thereby rotates. In this way, speed information representing its speed can be provided associated with each of the drive rollers, wherein for one of the drive rollers, this speed information is directly provided metrologically, for example, and for the other drive roller, this speed information can be ascertained taking into consideration various operating parameters, such as the speed of the electric motor 40, the delivery volume of the traction hydraulic pump 42, and the respective displacement of the traction hydraulic motors 46, 48 and includes the speed of the electric motor 40 as an essential and variable input parameter.

Taking this into consideration, speed information representing the speed of each drive roller can be provided for each of the drive rollers using a speed sensor only in association with one of the drive rollers and using the information provided in association with the electric motor 40 about its speed. On the basis of this speed information, slip state information can be generated which indicates whether the drive rollers are rotating at the target speed to be expected or whether one of the drive rollers is in a slip state.

The measures explained above can then be taken in order to brake the drive roller which is rotating too fast and to end the slip state.

Figure 5:
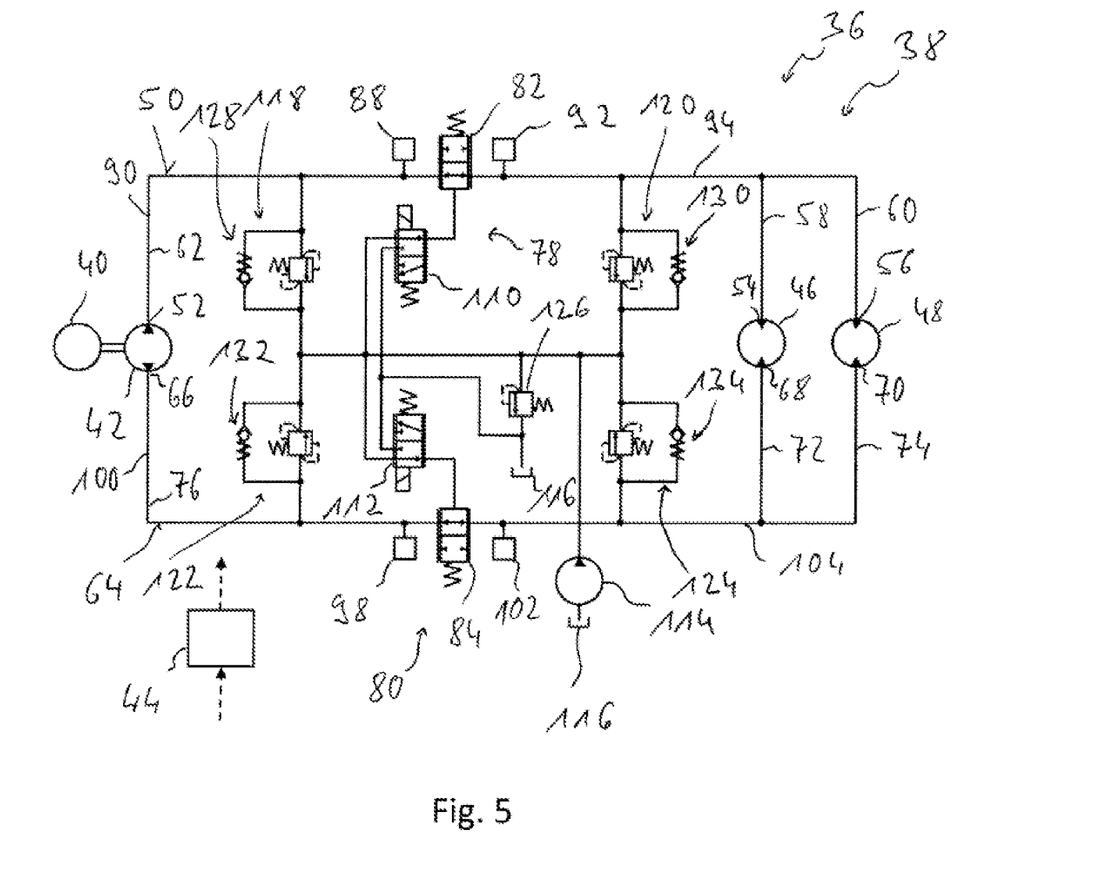
FIG. 5 shows a further alternative embodiment of an electrohydraulic drive system for a soil processing machine.

Another alternative embodiment of an electrohydraulic drive system 36 is shown in FIG. 5. In this electrohydraulic drive system 36, the first valve unit 82, which is again designed as a proportional valve, for example, is pressure controlled. By applying an actuation pressure to the first valve unit 82 designed as a normally closed valve, it can be adjusted between its blocking position and its open position in order to selectively establish or interrupt or throttle a fluid flow connection between the line sections 90, 94.

Accordingly, the second valve unit 84 is also designed as a pressure-controlled normally closed valve which, when a control pressure is applied, can be brought from the normally assumed blocking position into the open position, in order to thus selectively release or interrupt the fluid flow connection between the line sections 100, 104, or to create a throttling effect.

In association with the first valve unit 82, the valve assembly 78 comprises a first actuation valve 110. The first actuation valve 110, which is also designed as a proportional valve, for example, is under the actuation effect of the actuation unit 44. Upon corresponding actuation by the actuation unit 44, the first actuation valve 110 is brought out of its blocking position, in which a fluid pressure generated by a fluid pump 114 is not applied as actuation pressure to the first valve unit 82 and this is essentially depressurized on the actuation side or is open to a fluid reservoir 116, into its open position, as a result of which a fluid pressure generated by a fluid pump 114 is applied as actuation pressure to the first valve unit 82 and this is adjusted accordingly into its open position. The fluid pump 114 can be, for example, a fluid pump that is specially assigned to electrohydraulic drive system 36, or can be, for example, a fluid pump that feeds fluid to an electrohydraulic steering system of a soil compactor 10 and is also designed and arranged to replenish fluid from the fluid reservoir 116 into the electrohydraulic drive system 36.

In association with the second valve unit 84, the valve assembly 80 includes an actuation valve 112, which is also designed as a proportional valve. The actuation valve 112 under the actuation of the actuation unit 44 applies, upon corresponding actuation, the fluid pressure generated by the fluid pump 114 as actuation pressure to the second valve unit 84 in order to adjust it accordingly between the open position and the blocking position.

In association with the first line region 50, the valve assembly 78 furthermore comprises a first pressure relief valve 118 and a second pressure relief valve 120. Similarly, the valve assembly 80 comprises a third pressure relief valve 122 and a fourth pressure relief valve 124 in association with the second line region 64. The first pressure relief valve 118 connects the line section 90 of the first line region 50 via a replenishing pressure relief valve 126, which opens at a pressure of approximately 25 bar, for example, to the fluid reservoir 116. The second pressure relief valve 120 connects the line section 94 of the first line region 50 to the fluid reservoir 116 via the replenishing pressure relief valve 126. The third pressure relief valve 122 connects the line section 100 of the first line region 64 via the replenishing pressure relief valve 126 to the fluid reservoir 116. The fourth pressure relief valve 124 connects the line section 104 to the fluid reservoir 116 via the replenishing pressure relief valve 126.

In association with each of the pressure relief valves 118, 120, 122, 124, a respective check valve 128, 130, 132, 134 is provided. Each check valve 128, 130, 132, 134 provided in association with one of the pressure relief valves is used to prevent fluid from flowing out of a respective line section, which can be connected to the fluid reservoir 116 by a respective pressure relief valve, but enables replenishing of fluid conveyed by the fluid pump 114 into this respective line section of the first line region 50 or the second line region 64. Thus, under the conveying action of the fluid pump 114, when the electrohydraulic drive system 36 is operated to drive the soil compactor 10, fluid is replenished into that line region 50 or 64, which is used to return the fluid from the traction hydraulic motors 46, 48 to the traction hydraulic pump 52.

The electrohydraulic drive system 36 shown in FIG. 5 can basically be operated in the same way as the electrohydraulic drive systems 36 described above with reference to FIGS. 3 and 4. In particular, when a soil compactor 10 equipped with this electrohydraulic drive system 36 is in a driving mode and is to be braked and if it is recognized that the braking torque generated by the electric motor 40 in a particular operating state is not sufficient to brake the soil compactor 10 to the required extent, the fluid flow connection between the traction hydraulic motors 46, 48 and the traction hydraulic pump 42 can be interrupted or throttled by actuation of the actuation valve 110 or 112 and corresponding actuation of the pressure-controlled valve units 82, 84 and a braking torque can thus be generated. When such a braking process is carried out, as described above, that one of the two valve assemblies 78, 80 is actuated or operated to generate a braking torque that is assigned to that one of the two line regions 50, 64 via which fluid from the traction hydraulic motors 46, 48 flows back to the traction hydraulic pump 42. In such a braking state controlled via the actuation unit 44, the fluid pressure in the traction hydraulic circuit 38 is generally below a limiting fluid pressure of, for example, approximately 400 bar, which would result in the pressure relief valves 118, 120, 122, 124 opening.

If a fault state occurs in such a soil compactor 10, for example a power failure, the actuation valves 110, 112 and accordingly also the first valve unit 82 and second valve unit 84 enter their blocking state, in which the fluid flow connection from or to the traction hydraulic motors 46, 48 is interrupted in both line regions 50, 64. Due to the inertia of the soil compactor 10, the traction hydraulic motors 46, 48 work as pumps in this state and generate, depending on the existing direction of travel of the soil compactor 10, a strong pressure increase in the line section 94 or in the line section 104. If the fluid pressure exceeds the limiting fluid pressure of, for example, approximately 400 bar, the pressure relief valve associated with such a line section opens, so that fluid can flow back to the traction hydraulic motors 46, 48 via one of the check valves 130, 134 and the traction hydraulic motors 46, 48 working as pumps in this state are supplied with fluid. If, for example, the traction hydraulic motors 46, 48 convey fluid into the line section 104, the fourth pressure relief valve 124 opens due to the circumstance that the second valve unit 84 is in its blocking state, and fluid flows via it and the check valve 130 into the line section 94 and via it back to the traction hydraulic motors 46, 48.

If the electric motor 40 continues to be supplied with electrical voltage in such a state and is therefore still operated, the fluid pressure in the line section 90 of the first line region 50 also increases and can exceed the limiting fluid pressure. In this case, the first pressure relief valve 118 opens so that fluid can flow back to the traction hydraulic pump 42 via the check valve 132.

It is to be noted that the structure of an electrohydraulic drive system described above with reference to FIGS. 3, 4, and 5 can be varied in a wide variety of aspects. For example, as indicated by dashed lines in FIG. 3, a parallel connection of more than two traction hydraulic motors can be provided, wherein, as in the exemplary embodiment of FIG. 3, each of the two valve assemblies can respectively only comprise one valve unit positioned in a respective main line or, as illustrated in FIG. 4, in association with each of the traction hydraulic motors, each valve assembly can comprise a separate valve unit, optionally having an associated pressure sensor of the respective pressure sensor arrangement. The functionalities described above for generating a possibly additional braking torque, for preventing rolling away when starting uphill and for anti-slip control, can each be implemented individually or in any combination with one another in such an electrohydraulic drive system, in particular in the electrohydraulic drive system of FIG. 4.

The invention claimed is:

1. A soil processing machine, comprising at least one drive roller driven to rotate and an electrohydraulic drive system for driving at least one drive roller of the at least one drive roller, wherein the electrohydraulic drive system has a traction hydraulic circuit having at least one traction hydraulic motor in association with the at least one drive roller of the at least one drive roller and at least one traction hydraulic pump driven by an electric motor for conveying fluid in the traction hydraulic circuit, wherein the traction hydraulic circuit comprises a first line region between a first connection fitting of the at least one traction hydraulic pump and a respective first connection fitting of each traction hydraulic motor of the at least one traction hydraulic motor for conveying the fluid to each traction hydraulic motor of the at least one traction hydraulic motor to drive the at least one drive roller of the at least one drive roller in a first direction of rotation and a second line region between a second connection fitting of the at least one traction hydraulic pump and a respective second connection fitting of each traction hydraulic motor of the at least one traction hydraulic motor for conveying the fluid to each traction hydraulic motor to drive the at least one drive roller of the at least one driver roller in a second direction of rotation opposite to the first direction of rotation, wherein a valve assembly is provided in association with each line region of the first line region and the second line region for selectively interrupting and releasing a fluid flow connection between the at least one traction hydraulic pump and at least one traction hydraulic motor of the at least one traction hydraulic motor, wherein a first pressure sensor arrangement is provided in association with the valve assembly arranged in the first line region, wherein the first pressure sensor arrangement comprises at least one pressure sensor for detecting a fluid pressure in a line section of the first line region between the first connection fitting of the at least one traction hydraulic pump and the valve assembly arranged in the first line region and at least one pressure sensor for detecting a fluid pressure in a line section of the first line region between the valve assembly arranged in the first line region and the at least one traction hydraulic motor, and/or a second pressure sensor arrangement is provided in association with the valve assembly arranged in the second line region, wherein the second pressure sensor arrangement comprises at least one pressure sensor for detecting a fluid pressure in a line section of the second line region between the second connection fitting of the at least one traction hydraulic pump and the valve assembly arranged in the second line region and at least one pressure sensor for detecting a fluid pressure in a line section of the second line region between the valve assembly arranged in the second line region and the at least one traction hydraulic motor.

2. The soil processing machine as claimed in claim 1, wherein the at least one drive roller is a plurality of drive rollers and each drive roller of the plurality of drive rollers is assigned a traction hydraulic motor of the at least one traction hydraulic motor, wherein the first line region, associated with each traction hydraulic motor of the at least one traction hydraulic motor, comprises a first motor branch line providing a fluid flow connection to the first connection fitting of the at least one traction hydraulic pump, and the second line region, associated with each traction hydraulic motor of the at least one traction hydraulic motor, comprises a second motor branch line providing a fluid flow connection to the second connection fitting of the at least one traction hydraulic pump.

3. The soil processing machine as claimed in claim 2, wherein the valve assembly provided in association with the first line region comprises a first valve unit, wherein the first valve unit is arranged in association with the first line region for selectively interrupting and releasing the fluid flow connection between the at least one traction hydraulic pump and each traction hydraulic motor of the at least one traction hydraulic motor, and/or the valve assembly provided in association with the second line region comprises a second valve unit, wherein the second valve unit is arranged in association with the second line region for selectively interrupting and releasing the fluid flow connection between the at least one traction hydraulic pump and each traction hydraulic motor of the at least one traction hydraulic motor.

4. The soil processing machine as claimed in claim 3, wherein the first line region comprises a first main line connecting the first motor branch lines to the first connection fitting of the at least one traction hydraulic pump and the first valve unit is arranged in association with the first main line, and/or the second line region comprises a second main line connecting the second motor branch lines to the second connection fitting of the at least one traction hydraulic pump and the second valve unit is arranged in association with the second main line.

5. The soil processing machine as claimed in claim 3, wherein the first valve unit and/or the second valve unit comprises a proportional valve.

6. The soil processing machine as claimed in claim 5, wherein the first valve unit and/or the second valve unit is under the actuation of an actuation unit and is actuatable by the actuation unit for selectively interrupting and releasing the fluid flow connection between the at least one traction hydraulic pump and at least one traction hydraulic motor of the at least one traction hydraulic motor.

7. The soil processing machine as claimed in claim 5, wherein the first valve unit and/or the second valve unit is pressure-controlled, wherein the pressure-controlled first valve unit and the pressure-controlled second valve unit is assigned an actuation valve under the actuation of an actuation unit for applying a control pressure to the assigned valve unit of the first valve unit and second valve unit for selectively interrupting and releasing the fluid flow connection between the at least one traction hydraulic pump and at least one traction hydraulic motor.

8. The soil processing machine as claimed in claim 3, wherein the first valve unit and/or the second valve unit is a normally closed valve unit.

9. The soil processing machine as claimed in claim 3, wherein the valve assembly provided in association with the first line region comprises at least one pressure relief valve for feeding fluid back to the at least one traction hydraulic motor of the at least one traction hydraulic motor when a fluid limiting pressure is exceeded in the first line region, and/or the valve assembly provided in association with the second line region comprises at least one pressure relief valve for feeding fluid back to the at least one traction hydraulic motor of the at least one traction hydraulic motor when a fluid limiting pressure is exceeded in the second line region, and wherein the valve assembly provided in association with the first line region, in association with a line section of the first line region between the at least one traction hydraulic pump and the first valve unit, comprises a first pressure relief valve of the at least one pressure relief valve and, in association with a line section between the first valve unit and the at least one traction hydraulic motor of the at least one traction hydraulic motor, comprises a second pressure relief valve of the at least one pressure relief valve, and/or the valve assembly provided in association with the second line region, in association with a line section of the second line region between the at least one traction hydraulic pump and the second valve unit, comprises a third pressure relief valve of the at least one pressure relief valve and, in association with a line section between each second valve unit and the at least one traction hydraulic motor of the at least one traction hydraulic motor, comprises a fourth pressure relief valve of the at least one pressure relief valve.

10. The soil processing machine as claimed in claim 2, wherein the valve assembly provided in the first line region respectively comprises a first valve unit in association with each traction hydraulic motor of the at least one traction hydraulic motor for selectively interrupting and releasing the fluid flow connection between the at least one traction hydraulic pump and the respective assigned traction hydraulic motor of the at least one traction hydraulic motor, and/or the valve assembly provided in the second line region respectively comprises a second valve unit in association with each traction hydraulic motor of the at least one traction hydraulic motor for selectively interrupting and releasing the fluid flow connection between the at least one traction hydraulic pump and the respective associated traction hydraulic motor of the at least one traction hydraulic motor.

11. The soil processing machine as claimed in claim 10, wherein, for each traction hydraulic motor of the at least one traction hydraulic motor, the first valve unit assigned to this traction hydraulic motor of the at least one traction hydraulic motor is arranged in association with the first motor branch line connecting this traction hydraulic motor of the at least one traction hydraulic motor to the first connection fitting of the at least one traction hydraulic pump, and/or, for each traction hydraulic motor of the at least one traction hydraulic motor, the second valve unit assigned to this traction hydraulic motor of the at least one traction hydraulic motor is arranged in association with the second motor branch line connecting this traction hydraulic motor of the at least one traction hydraulic motor to the second connection fitting of the at least one traction hydraulic pump.

12. The soil processing machine as claimed in claim 10, wherein the first line region comprises a first main line connecting the first motor branch lines to the first connection fitting of the at least one traction hydraulic pump, and/or the second line region comprises a second main line connecting the second motor branch lines to the second connection fitting of the at least one traction hydraulic pump.

13. The soil processing machine as claimed in claim 10, wherein a first pressure sensor arrangement is provided in association with the valve assembly arranged in the first line region, wherein the first pressure sensor arrangement comprises at least one pressure sensor for detecting a fluid pressure in a line section of the first line region between the first connection fitting of the at least one traction hydraulic pump and the valve assembly arranged in the first line region and at least one pressure sensor for detecting a fluid pressure in a line section of the first line region between the valve assembly arranged in the first line region and the at least one traction hydraulic motor, and/or a second pressure sensor arrangement is provided in association with the valve assembly arranged in the second line region, wherein the second pressure sensor arrangement comprises at least one pressure sensor for detecting a fluid pressure in a line section of the second line region between the second connection fitting of the at least one traction hydraulic pump and the valve assembly arranged in the second line region and at least one pressure sensor for detecting a fluid pressure in a line section of the second line region between the valve assembly arranged in the second line region and the at least one traction hydraulic motor, wherein the first pressure sensor arrangement comprises, in association with each first motor branch line, a respective pressure sensor for detecting a fluid pressure in a line section of a respective first motor branch line between the first valve unit assigned thereto and the traction hydraulic motor assigned thereto, and/or the second pressure sensor arrangement respectively comprises, in association with each second motor branch line, a pressure sensor for detecting a fluid pressure in a line section of a respective second motor branch line between the second valve unit assigned thereto and the traction hydraulic motor assigned thereto.

14. The soil processing machine as claimed in claim 1, wherein the valve assembly provided in association with the first line region comprises at least one pressure relief valve for feeding fluid back to the at least one traction hydraulic motor of the at least one traction hydraulic motor when a fluid limiting pressure is exceeded in the first line region, and/or the valve assembly provided in association with the second line region comprises at least one pressure relief valve for feeding fluid back to the at least one traction hydraulic motor of the at least one traction hydraulic motor when a fluid limiting pressure is exceeded in the second line region.

15. The soil processing machine as claimed in claim 1, wherein, in association with the at least one drive roller of the at least one driver roller, a speed sensor is provided for providing speed information representing a speed of the at least one drive roller of the at least one drive roller.

16. The soil processing machine as claimed in claim 1, wherein the at least one drive roller of the at least one drive roller comprises a soil processing roller having a metal casing, and/or the at least one drive roller of the at least one drive roller comprises at least one drive wheel, and/or the at least one drive roller of the at least one drive roller comprises at least one rubber-wheel roller.

17. A method for operating a soil processing machine as claimed in claim 1, comprising the measures:

a) in a drive state, driving the at least one traction hydraulic pump in such a way that fluid is conveyed via one line region of the first line region and second line region to the at least one traction hydraulic motor of the at least one traction hydraulic motor and fluid flows back via the other line region of the first line region and second line region to the at least one traction hydraulic pump, b) in a braking state following the drive state, interrupting or throttling a fluid flow in the other line region by means of the valve assembly arranged in the other line region.

18. The method as claimed in claim 17, wherein in measure a), the valve assembly arranged in the first line region is in an open state that essentially does not throttle the fluid flow in the first line region and the valve assembly arranged in the second line region is in an open state that essentially does not throttle the fluid flow in the second line region.

19. A method for operating a soil processing machine as claimed in claim 1, comprising the measures:

a) in a standstill state, switching the valve assembly arranged in the first line region into a blocking state interrupting the fluid flow in the first line region and switching the valve assembly arranged in the second line region into a blocking state interrupting the fluid flow in the second line region, b) in the standstill state, detecting a first fluid pressure in a line section of the first line region between the valve assembly arranged in the first line region and the at least one traction hydraulic motor of the at least one traction hydraulic motor and detecting a second fluid pressure in a line section of the second line region between the valve assembly arranged in the second line region and the at least one traction hydraulic motor of the at least one traction hydraulic motor, and c) upon ending of the standstill state for the transition to a drive state, actuating the electric motor assigned to the at least one traction hydraulic pump, taking into consideration the first fluid pressure detected in measure b) or the second fluid pressure detected in measure b).

20. The method as claimed in claim 19, wherein in measure c), the electric motor assigned to the at least one traction hydraulic pump is actuated taking into consideration a higher fluid pressure of the first fluid pressure and second fluid pressure.

21. The method as claimed in claim 20, wherein in measure b) and/or measure c), a third fluid pressure in a line section of the first line region between the at least one traction hydraulic pump and the valve assembly arranged in the first line region and/or a fourth fluid pressure in a line section of the second line region between the at least one traction hydraulic pump and the valve assembly arranged in the second line region is detected, and in that in measure c), if the first fluid pressure is higher than the second fluid pressure, the electric motor assigned to the at least one traction hydraulic pump is actuated to convey fluid into the first line region in such a way that the third fluid pressure essentially corresponds to the first fluid pressure, and in that in measure c), if the second fluid pressure is higher than the first fluid pressure, the electric motor assigned to the at least one traction hydraulic pump is actuated to convey fluid into the second line region in such a way that the fourth fluid pressure essentially corresponds to the second fluid pressure.

22. The control method as claimed in claim 21, wherein in measure c), the valve assemblies are switched from the blocking state to an open state when the third fluid pressure essentially corresponds to the first fluid pressure or when the fourth fluid pressure essentially corresponds to the second fluid pressure.

23. The control method as claimed in claim 22, wherein after the valve assemblies have been switched into the open state, the electric motor assigned to the at least one traction hydraulic pump is actuated to further increase the fluid pressure.

24. A method for operating a soil processing machine as claimed in claim 1, comprising the measures:

a) in drive state, driving the at least one traction hydraulic pump in such a way that fluid is conveyed via a line region of the first line region and second line region to a first traction hydraulic motor of the at least one traction hydraulic motor assigned to a first drive roller of the at least one drive roller and to a second traction hydraulic motor of the at least one traction hydraulic motor assigned to a second drive roller of the at least one drive roller and fluid flows back via the other line region of the first line region and the second line region from the first traction hydraulic motor and the second traction hydraulic motor to the at least one traction hydraulic pump, b) in the drive state, providing slip state information based on first speed information representing a speed of the first drive roller and/or second speed information representing a speed of the second drive roller, and c) if the slip state information indicates an excessively high speed in one drive roller of the first drive roller and second drive roller in comparison to the other drive roller of the first drive roller and second drive roller, throttling the fluid flow to the traction hydraulic motor of the first traction hydraulic motor and second traction hydraulic motor by means of the valve assembly arranged in the first line region and/or the valve assembly arranged in the second line region.

25. The method as claimed in claim 24, wherein in measure c), the fluid flow to the traction hydraulic motor of the first traction hydraulic motor and the second traction hydraulic motor assigned to one drive roller of the first drive roller and the second drive roller is throttled by means of the valve assembly arranged in the other line region of the first line region and second line region.

26. The method as claimed in claim 24, wherein in measure c), the valve assembly arranged in the first line region and/or the valve assembly arranged in the second line region is actuated to throttle the fluid flow to the traction hydraulic motor assigned to the one drive roller of the first drive roller and second drive roller, if speed information of the first speed information and second speed information indicates a speed that is above a target speed of the assigned drive roller, wherein the target speed is determined based on the first speed information and/or the second speed information.

27. A method for operating a soil processing machine, the soil processing machine comprising at least one drive roller driven to rotate and an electrohydraulic drive system for driving at least one drive roller of the at least one drive roller, wherein the electrohydraulic drive system has a traction hydraulic circuit having at least one traction hydraulic motor in association with the at least one drive roller of the at least one drive roller and at least one traction hydraulic pump driven by an electric motor for conveying fluid in the traction hydraulic circuit, wherein the traction hydraulic circuit comprises a first line region between a first connection fitting of the at least one traction hydraulic pump and a respective first connection fitting of each traction hydraulic motor of the at least one traction hydraulic motor for conveying the fluid to each traction hydraulic motor of the at least one traction hydraulic motor to drive the at least one drive roller of the at least one drive roller in a first direction of rotation and a second line region between a second connection fitting of the at least one traction hydraulic pump and a respective second connection fitting of each traction hydraulic motor of the at least one traction hydraulic motor for conveying the fluid to each traction hydraulic motor to drive the at least one drive roller of the at least one drive roller in a second direction of rotation opposite to the first direction of rotation, wherein a valve assembly is provided in association with each line region of the first line region and the second line region for selectively interrupting and releasing a fluid flow connection between the at least one traction hydraulic pump and at least one traction hydraulic motor of the at least one traction hydraulic motor, the method comprising the measures:

a) in a standstill state, switching the valve assembly arranged in the first line region into a blocking state interrupting the fluid flow in the first line region and switching the valve assembly arranged in the second line region into a blocking state interrupting the fluid flow in the second line region, b) in the standstill state, detecting a first fluid pressure in a line section of the first line region between the valve assembly arranged in the first line region and the at least one traction hydraulic motor of the at least one traction hydraulic motor and detecting a second fluid pressure in a line section of the second line region between the valve assembly arranged in the second line region and the at least one traction hydraulic motor of the at least one traction hydraulic motor, c) upon ending of the standstill state for the transition to a drive state, actuating the electric motor assigned to the at least one traction hydraulic pump, taking into consideration the first fluid pressure detected in measure b) or the second fluid pressure detected in measure b), wherein in measure c), the electric motor assigned to the at least one traction hydraulic pump is actuated taking into consideration a higher fluid pressure of the first fluid pressure and second fluid pressure.

\* \* \* \* \*